(12) United States Patent
Pippard et al.

(10) Patent No.: US 7,883,307 B2
(45) Date of Patent: Feb. 8, 2011

(54) SELF-DRILLING FASTENER

(75) Inventors: Bruce A. Pippard, Newmarket (CA);
Richard J. Ernst, San Diego, CA (US);
John P. Grimm, Santee, CA (US)

(73) Assignee: Illinois Tool Works Inc., Glenview, IL (US)

( * ) Notice: Subject to any disclaimer, the term of this patent is extended or adjusted under 35 U.S.C. 154(b) by 162 days.

(21) Appl. No.: 12/394,341

(22) Filed: Feb. 27, 2009

(65) Prior Publication Data
US 2010/0221086 A1 Sep. 2, 2010

(51) Int. Cl.
*F16B 25/10* (2006.01)
(52) U.S. Cl. .................. 411/387.1; 411/412; 411/387.3
(58) Field of Classification Search .............. 411/387.1, 411/387.3, 387.5, 403, 412
See application file for complete search history.

(56) References Cited

U.S. PATENT DOCUMENTS

| | | | |
|---|---|---|---|
| 126,366 A | 4/1872 | Wills |
| 252,752 A | 1/1882 | Tower |
| 350,209 A | 10/1886 | Parmelee |
| 516,134 A | 6/1894 | Stilwell |
| 525,752 A | 9/1894 | Tower |
| 927,483 A | 7/1909 | Bradley |
| 984,969 A | 2/1911 | Reiniger |
| 1,031,639 A | 7/1912 | Funderburg |
| 1,051,444 A | 1/1913 | Pleister |
| 1,095,068 A | 4/1914 | Bate |
| 1,184,173 A | 5/1916 | Gehring |
| 1,201,295 A | 10/1916 | Handee |
| 1,248,008 A | 11/1917 | Pleister |
| 1,270,036 A | 6/1918 | LeClaire |
| 1,272,265 A | 7/1918 | Horn |
| 1,491,203 A | 4/1924 | Enoch |
| 1,634,234 A | 6/1927 | Pierce |

(Continued)

FOREIGN PATENT DOCUMENTS

CA    2 484 381 A1    4/2006

(Continued)

OTHER PUBLICATIONS

International Searching Authority (ISA), European Patent Office (EPO), International Search Report for PCT/US2007/019419 mailed Oct. 23, 2008.

(Continued)

*Primary Examiner*—Gary Estremsky
(74) *Attorney, Agent, or Firm*—Mark W. Croll; Christopher P. Rauch; Beem Patent Law Firm (57) ABSTRACT

A self-drilling fastener from which objects may be hung, for use in a friable material with or without an underlying member at the point of use or in a semi-rigid material such as a hollow core door comprises an elongated body having a threaded exterior with separate threads for drilling into the member, gripping the member, gripping the friable material and/or gripping the semi-rigid material. The fastener may further have a thread having a relatively small-diametered solid portion from which objects hang and an axially expanding angled portion for biasing the object toward the solid portion to stabilize and prevent the object from dislodging from the fastener.

16 Claims, 2 Drawing Sheets

U.S. PATENT DOCUMENTS

| | | | |
|---|---|---|---|
| 1,825,419 A | 9/1931 | Plym | |
| 1,963,799 A | 6/1934 | Nelson | |
| 2,026,686 A | 1/1936 | Kirley | |
| 2,093,172 A | 9/1937 | Olson | |
| 2,263,424 A | 11/1941 | Langer | |
| 2,301,181 A | 11/1942 | Ilsemann | |
| 2,400,684 A | 5/1946 | Clark | |
| 2,419,555 A | 4/1947 | Fator | |
| 2,601,872 A | 7/1952 | Kaufmann | |
| 2,654,284 A | 10/1953 | Schevenell | |
| 2,883,720 A | 4/1959 | Hansen | |
| 3,049,323 A | 8/1962 | Peterka | |
| 3,117,486 A | 1/1964 | Matthews | |
| 3,183,531 A | 5/1965 | McKewan | |
| 3,199,398 A | 8/1965 | Tibor Weisz | |
| 3,263,949 A | 8/1966 | Conrad | |
| RE26,111 E * | 11/1966 | Laverty | 426/485 |
| 3,295,579 A | 1/1967 | Medal | |
| 3,318,182 A | 5/1967 | Carlson | |
| 3,385,156 A | 5/1968 | Polos | |
| 3,404,476 A | 10/1968 | Hoffman, Jr. | |
| 3,522,756 A | 8/1970 | Von Wolff | |
| 3,578,762 A | 5/1971 | Siebol | |
| 3,595,124 A | 7/1971 | Lindstrand et al. | |
| 3,641,866 A | 2/1972 | Mortensen | |
| 3,662,644 A | 5/1972 | Flesch et al. | |
| 3,667,526 A | 6/1972 | Neuschotz | |
| 3,711,138 A | 1/1973 | Davis | |
| 3,752,030 A | 8/1973 | Steurer | |
| 3,882,917 A | 5/1975 | Orlomoski | |
| 3,911,781 A | 10/1975 | Bappert | |
| 3,942,405 A * | 3/1976 | Wagner | 411/386 |
| 4,003,287 A | 1/1977 | Ziaylek, Jr. | |
| 4,024,899 A | 5/1977 | Stewart | |
| 4,075,924 A | 2/1978 | McSherry et al. | |
| 4,202,244 A | 5/1980 | Gutshall | |
| 4,221,154 A | 9/1980 | McSherry | |
| 4,233,881 A | 11/1980 | Carrier | |
| 4,252,168 A | 2/1981 | Capuano | |
| 4,298,298 A | 11/1981 | Pontone | |
| 4,322,194 A | 3/1982 | Einhorn | |
| 4,323,326 A | 4/1982 | Okada et al. | |
| 4,441,619 A | 4/1984 | Gibitz | |
| 4,488,843 A | 12/1984 | Achille | |
| 4,537,185 A | 8/1985 | Stednitz | |
| 4,601,625 A | 7/1986 | Ernst et al. | |
| 4,642,012 A | 2/1987 | Blucher et al. | |
| 4,653,244 A * | 3/1987 | Farrell | 52/745.21 |
| 4,653,489 A | 3/1987 | Tronzo | |
| 4,708,552 A | 11/1987 | Bustos | |
| 4,712,957 A | 12/1987 | Edwards et al. | |
| 4,763,456 A | 8/1988 | Giannuzzi | |
| 4,856,951 A | 8/1989 | Blucher et al. | |
| 4,871,289 A | 10/1989 | Choiniere | |
| 4,892,429 A | 1/1990 | Giannuzzi | |
| 5,039,262 A | 8/1991 | Giannuzzi | |
| 5,044,853 A | 9/1991 | Dicke | |
| 5,047,030 A | 9/1991 | Draenert | |
| 5,059,077 A | 10/1991 | Schmid | |
| 5,098,435 A | 3/1992 | Stednitz et al. | |
| 5,145,301 A | 9/1992 | Yamamoto | |
| 5,160,225 A | 11/1992 | Chern | |
| 5,161,296 A | 11/1992 | Garfield et al. | |
| 5,190,425 A | 3/1993 | Wieder et al. | |
| 5,226,766 A | 7/1993 | Lasner | |
| 5,234,299 A | 8/1993 | Giannuzzi | |
| 5,267,423 A | 12/1993 | Giannuzzi | |
| 5,308,203 A | 5/1994 | McSherry et al. | |
| 5,340,362 A | 8/1994 | Carbone | |
| 5,372,346 A | 12/1994 | Upchurch et al. | |
| 5,403,137 A | 4/1995 | Grun et al. | |
| 5,413,444 A | 5/1995 | Thomas et al. | |
| 5,449,257 A | 9/1995 | Giannuzzi | |
| 5,482,418 A | 1/1996 | Giannuzzi | |
| 5,529,449 A | 6/1996 | McSherry et al. | |
| 5,536,121 A | 7/1996 | McSherry | |
| 5,558,479 A | 9/1996 | McElderry | |
| 5,562,672 A | 10/1996 | Huebner et al. | |
| 5,625,994 A | 5/1997 | Giannuzzi | |
| 5,690,454 A | 11/1997 | Smith | |
| 5,692,864 A | 12/1997 | Powell et al. | |
| 5,693,099 A | 12/1997 | Harle | |
| 5,752,792 A | 5/1998 | McSherry | |
| 5,833,415 A | 11/1998 | McSherry | |
| 5,882,162 A | 3/1999 | Kaneko | |
| 5,944,295 A | 8/1999 | McSherry | |
| 5,991,998 A * | 11/1999 | Kaneko | 29/432.2 |
| 6,003,691 A | 12/1999 | Owen | |
| 6,048,343 A | 4/2000 | Mathis et al. | |
| 6,079,921 A | 6/2000 | Gauthier et al. | |
| 6,139,236 A | 10/2000 | Ito | |
| 6,186,716 B1 | 2/2001 | West et al. | |
| 6,196,780 B1 | 3/2001 | Wakai et al. | |
| 6,214,012 B1 | 4/2001 | Karpman et al. | |
| 6,250,865 B1 | 6/2001 | McSherry | |
| 6,264,677 B1 | 7/2001 | Simon et al. | |
| 6,280,675 B1 | 8/2001 | Legrand | |
| 6,354,779 B1 | 3/2002 | West et al. | |
| 6,361,258 B1 | 3/2002 | Heesch | |
| 6,382,892 B1 | 5/2002 | Hempfling | |
| 6,419,436 B1 | 7/2002 | Gaudron | |
| 6,484,888 B2 | 11/2002 | Miller | |
| 6,558,098 B1 * | 5/2003 | Angehrn et al. | 411/533 |
| 6,676,350 B1 | 1/2004 | McSherry et al. | |
| 6,755,835 B2 | 6/2004 | Schultheiss et al. | |
| 6,846,142 B2 | 1/2005 | Gens | |
| 7,040,850 B2 | 5/2006 | Gaudron | |
| 7,160,074 B2 | 1/2007 | Ernst et al. | |
| 7,266,874 B2 | 9/2007 | Ernst et al. | |
| 2004/0146377 A1 | 7/2004 | Chen | |
| 2005/0031434 A1 | 2/2005 | Gaudron | |
| 2005/0079027 A1 * | 4/2005 | Ernst et al. | 411/44 |
| 2005/0084360 A1 | 4/2005 | Panasik et al. | |
| 2005/0175429 A1 | 8/2005 | Panasik et al. | |
| 2006/0018730 A1 * | 1/2006 | Ernst | 411/31 |
| 2007/0183866 A1 | 8/2007 | Gallien | |
| 2008/0014047 A1 * | 1/2008 | Dohi | 411/387.4 |
| 2008/0019792 A1 | 1/2008 | Ernst et al. | |
| 2008/0080953 A1 * | 4/2008 | Wu | 411/412 |

FOREIGN PATENT DOCUMENTS

| | | |
|---|---|---|
| DE | 0217821 C | 5/1909 |
| DE | 0274731 | 5/1914 |
| DE | 0545634 C | 3/1932 |
| DE | 03704089 | 8/1988 |
| DE | 04016724 | 11/1991 |
| DE | 40 41 765 A1 | 6/1992 |
| DE | 04121751 | 1/1993 |
| DE | 04122950 | 1/1993 |
| DE | 09301098 | 3/1993 |
| DE | 29502052 | 3/1995 |
| DE | 04343329 | 6/1995 |
| DE | 04439973 | 6/1995 |
| DE | 29509487 | 8/1995 |
| DE | 19852339 | 5/2000 |
| DE | 20111194 | 9/2001 |
| DE | 10038016 | 2/2002 |
| EP | 0305417 | 3/1989 |
| EP | 0400 535 | 12/1990 |
| EP | 0425358 | 5/1991 |
| EP | 0428127 | 5/1991 |
| EP | 0434604 | 6/1991 |
| EP | 0516569 | 12/1992 |

| | | |
|---|---|---|
| EP | 0575295 | 12/1993 |
| EP | 0669471 | 8/1995 |
| EP | 0874165 | 10/1998 |
| EP | 0951869 | 10/1999 |
| EP | 0965767 | 12/1999 |
| EP | 1001178 A2 | 5/2000 |
| EP | 1004781 | 5/2000 |
| EP | 1050689 | 8/2000 |
| EP | 1298331 B1 | 4/2003 |
| EP | 1 505 304 A1 | 2/2005 |
| EP | 12522744 | 4/2005 |
| FR | 2588332 | 4/1987 |
| FR | 439 431 | 9/1996 |
| FR | 439 432 | 9/1996 |
| GB | 0413027 | 7/1934 |
| GB | 1141913 | 2/1969 |
| GB | 1166262 | 10/1969 |
| GB | 1487032 | 9/1977 |
| GB | 2208417 | 3/1989 |
| GB | 2357130 | 6/2001 |
| JP | 2005121224 | 5/2005 |
| WO | WO 96/16273 | 5/1996 |
| WO | WO 99/05420 | 2/1999 |
| WO | WO 00/25030 | 5/2000 |
| WO | WO 2004/053341 | 6/2004 |
| WO | WO 2004/079209 | 9/2004 |
| WO | WO 2004/079210 | 9/2004 |
| WO | WO 2005/038275 | 4/2005 |
| WO | WO 2006/031421 | 3/2006 |
| WO | WO 2006/135558 A3 | 12/2006 |

OTHER PUBLICATIONS

Ernst et al., U.S. Appl. No. 10/844,706, filed May 12, 2004, "Self-Drilling Anchor".

Panasik et al., U.S. Appl. No. 10/934,913, filed Sep. 3, 2004, "Self-Drilling Anchor".

Ernst et al., U.S. Appl. No. 11/148,158, filed Jun. 8, 2005, "Drywall Fastener".

Ernst et al., U.S. Appl. No. 11/215,651, filed Aug. 30, 2005, "A Method of Making a Self-Drilling Anchor".

Ernst et al., U.S. Appl. No. 11/245,385, filed Oct. 6, 2005, "Garage Hook".

Ernst et al., U.S. Appl. No. 11/832,311, filed Aug. 1, 2007, "Drywall Fastener".

ISA, International Search Report, Sep. 6, 2006, International Application No. PCT/US2006/020692.

ISA, International Search Report, Oct. 24, 2006, International Application No. PCT/US2006/020693.

ISA, International Search Report, Jan. 25, 2006, International Application No. PCT/US2005/030652.

ISA, International Search Report, Jan. 27, 2005, International Application No. PCT/US2004/032281.

ISA, International Search Report, Jan. 11, 1999, International Application No. PCT/CA1998/00717.

French Search Report, 2 pages.

SPIT Mini DRIVA product sheet, Nov. 23, 2004, 1 page.

SPIT, Mini Driva, website http://www.spit.fr/prpoduits/imprProd.php?prod=31&langue=fr, Mar. 10, 2005, France, 1 page.

Current Solutions, revised, "Existing Garage Hook Solution Summary", 5 pages.

ITW Brands E-Z Anchor, E-Z Hanger, Feb. 23, 2009, http://www.itwbrands.com/productparts/prod_ezanchor_hanger_part.htm, Feb. 23, 2009, 1 page.

Ernst et al., U.S. Appl. No. 12/167,742, filed Jul. 3, 2008, "Self-Drilling Anchor".

International Searching Authority (ISA), European Patent Office (EPO), International Search Report for PCT/US2010/022180 mailed May 10, 2010, 3 pages.

* cited by examiner

SELF-DRILLING FASTENER

BACKGROUND OF THE INVENTION

1. Field of the Invention

The present invention is directed to a fastener from which objects can be hung. It is particularly directed to a self-drilling fastener to be used in a friable material such as drywall, in drywall mounted to a member or in thin rigid or semi-rigid materials such as hollow-core doors.

2. Description of the Related Art

Because drywall is a friable material, mounting articles thereto can be difficult. In the past, at least three methods have been used. For light weight articles, small plastic expansion anchors have been used. These expansion anchors have typically required three steps to install: first, a hole is drilled into the drywall; second, the drywall fastener insert is driven into the drilled hole; and finally, a threaded fastener is advanced into the drywall fastener, spreading the drywall fastener into engagement with the drywall. However, expansion anchors can typically hold light loads only.

For heavy duty applications, toggle bolts have been used. While toggle bolts have been effective, they are also generally expensive because they involve parts which must move relative to one another. Toggle bolts also have been known to be difficult to install.

Self-drilling anchors for mounting heavier loads also have been used. These self-drilling anchors typically are installed by drilling into the drywall with the drywall fastener itself. The drywall fastener also includes threading having a high thread height to provide a high pullout in the drywall. Examples of self-drilling anchors include the drywall fastener sold under the trademark E-Z ANCOR manufactured by ITW Buildex, and those disclosed in U.S. Pat. Nos. 4,601,625, 5,190,425, and 5,558,479, all of which are assigned to the assignee of this application.

Self-drilling anchors have proved effective for holding higher loads when installed in drywall alone. However, in most cases the drywall is mounted to wood support members, or studs, that are unseen by the user, and typically the location of these support members are unknown and unchecked by the user. When a user of a typical self-drilling fastener attempts to install the drywall fastener in drywall at a location of a support member, the drywall fastener is unable to drill into the support member, causing the drywall fastener to spin in place so that the drywall fastener's high threading strips out the drywall, resulting in failure of the drywall fastener and creating an unsightly scar on the wall. Even if the drywall fastener is able to drill into the support member slightly, the anchors have been known to tightly engage the support member and break due to torsion on the anchor.

Mounting self-drilling fasteners to relatively thin semi-rigid materials such as a veneered panel of a hollow door can also be difficult. The small thickness of the material and the splintering caused during driving may significantly reduce the holding strength of the fastener.

In many of these cases, the head of the fastener seats flush with the mounting surface, preventing a user from hanging an object from the fastener. In order to remedy this situation, a user may not install a fastener fully, leaving a portion of it protruding from the wall. In this instance, the threads of the fastener may not be engaged fully with the mounting surface, thereby weakening the holding capability of the fastener.

What is needed is a self-drilling fastener that can be installed either in drywall, in drywall and a support member or in a rigid or semi-rigid material and is capable of handling a heavy load.

BRIEF SUMMARY OF THE INVENTION

A novel self drilling drywall fastener is provided for use in a friable material mounted on support member. The self drilling drywall fastener comprises a thin, elongate body having an axis, an exterior thread having a root, a proximal end, and a drilling end opposite the proximal end; wherein the exterior thread and said root together provide sufficient structural support to said body to withstand a torsion force required for the drilling end to penetrate a substrate adjacent the friable material, the substrate having a hardness greater than the hardness of the friable material.

In one embodiment, a self drilling fastener hanging an object comprises an elongated body having an axis, a threaded exterior having a root, a proximal portion, an intermediate portion, a distal portion, and a drilling tip generally opposite the enlarged head; the proximal portion having an axial length and threads adapted for gripping a friable material, the threads having a root diameter, a crest diameter at least about twice the root diameter and a thread height; the intermediate portion having an axial length and threads adapted for gripping a member underlying the friable material, the member having a hardness greater than a hardness of said friable material, the intermediate portion threads having a crest diameter substantially smaller than the crest diameter of the proximal portion thread and a thread height substantially smaller than the thread height of the proximal portion thread; the distal portion having an axial length and threads for drilling into the member, a root that tapers toward the drilling tip, the distal portion threads having a crest diameter substantially smaller than the crest diameter of the proximal portion thread and a thread height substantially smaller than the thread height of the proximal portion thread; and a flange proximate a rear end of the proximal portion thread, the flange having a diameter larger than the proximal portion crest diameter; a head extending rearwardly from the flange, the head having an angled underside expanding outwardly from said flange toward a rear surface. The fastener further may comprise a generally axially extending portion between the flange and the underside of said head in which a portion of the object to be mounted may rest. In addition, the fastener may have torque transmitting surfaces within the head that are angled substantially similarly with respect to the axis as the angled underside of the head and further may have a solid, generally axially extending portion between the torque transmitting surfaces and the flange.

In another embodiment, a self-drilling fastener adapted for mounting in a plurality of substrates of different types, comprising: a shank having a generally conical drilling portion, an intermediate portion and a proximal portion; the generally conical drilling portion having a drilling tip and a thread; the intermediate portion having a thread larger than the drilling portion thread and a crest diameter larger than a largest crest diameter of the drilling portion; the proximal portion having a thread larger than the intermediate portion thread and substantially larger than the drilling portion thread and a crest diameter larger than the intermediate portion crest diameter and substantially larger than the drilling portion largest crest diameter; a substantially unthreaded portion proximate the proximal portion and leading to a generally cylindrical flange; an elongated head extending from the flange, the elongated head comprising a solid-bodied generally cylindrical portion proximate the flange and a generally frustoconical portion extending to a rearward end of the fastener. The fastener may also include a second drilling thread around the drilling portion, a plurality of wings disposed on the drilling portion, the wings having a radial extent substantially equal to a largest root diameter of the shank, and a second thread disposed around a portion of the proximal portion wherein the second thread extends for about one-half of a revolution around the proximal portion. Additionally, the generally cylindrical flange may have a diameter larger than a largest crest diameter of the proximal portion thread. Moreover, the fastener may have a first radius of curvature between the shank and generally cylindrical flange and a second radius of curvature between the generally cylindrical flange and solid-bodied generally cylindrical portion.

In still another embodiment, a self-drilling fastener adapted for hanging an object, comprising: a shank having a first threading adapted for gripping a friable material, a second threading adapted for gripping a member underlying the friable material, the member having a hardness greater than a hardness of the friable material, a third threading adapted for drilling into the member and a fourth threading adapted for gripping a semi-rigid material. The fastener also may comprise a generally cylindrical flange proximate the shank and an elongated head having a generally cylindrical portion proximate the generally cylindrical flange and a generally frustoconical portion proximate the generally cylindrical portion. The first and fourth threadings may cooperate to maintain a thickness of the semi-rigid material between turns of the first and fourth threading. In addition, the generally cylindrical portion may have a diameter smaller than a largest diameter of the shank, and the generally frustoconical portion may angle approximately 25 degrees with respect to an axis of the fastener. The elongated head, which may have a length between about ¼ inch and about 5/16 inch, further may comprise torque transmitting surface inclined with respect to an axis of the fastener at substantially a same angle as an underside of the generally frustoconical section, and the torque transmitting surfaces may have an axial extent from a rear surface of the fastener less than an axial extent of the generally frustoconical section.

These and other features and advantages are evident from the following description of the present invention, with reference to the accompanying drawings.

DETAILED DESCRIPTION OF THE INVENTION

Figure 1:
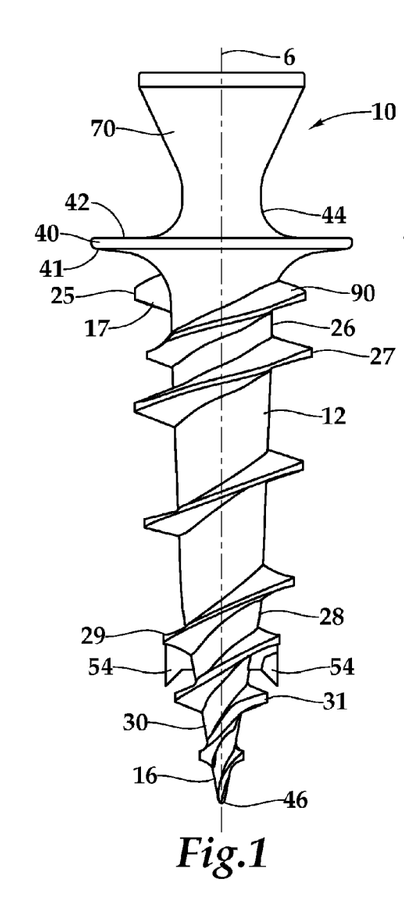
FIG. 1 is a side view of a fastener according to one embodiment of the present invention.
Figure 2:
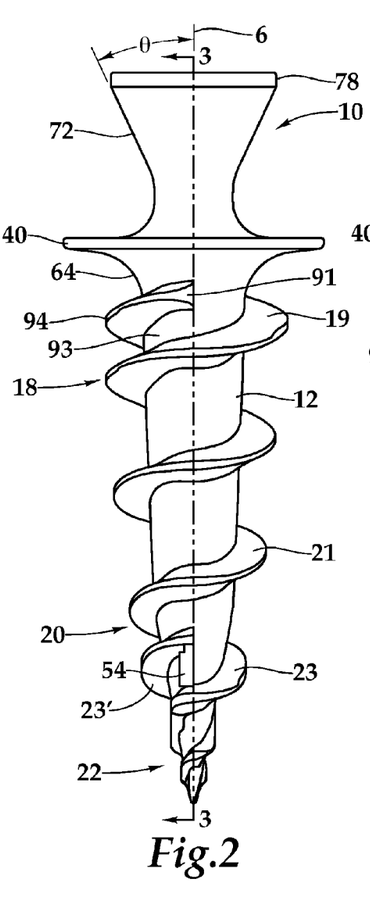
FIG. 2 is a side view of the fastener of FIG. 1, rotated 90° from the view of FIG. 1.

Referring to FIGS. 1-2, a novel self-drilling fastener 10 is shown. Fastener 10 is for driving into drywall 1 for mounting an article 3 to drywall 1 or for driving into and mounting to an article to a rigid or semi-rigid material 7 such as the panel of a hollow core door. Fastener 10 may have a longer head 70 with a more angled underside 72 than other fasteners for broader use in hanging objects from head 70 and for better performance in holding those objects. In addition, fastener 10 has features enabling it to penetrate and engage a variety of surfaces including friable materials such as drywall 1, harder materials such as studs 2 underlying the drywall 1 or semi-rigid hollow surfaces 7 such as thin-paneled hollow core doors. Fastener 10 is for driving into drywall 1 for hanging an article against drywall 1.

In one aspect, fastener 10 is for use in a friable material 1, such as drywall, mounted on a member 2, such as a support member or stud, the novel fastener 10 having an elongated body 12 with an axis 6, a head 14 having torque transmitting surfaces 15 therein, a proximal portion 18 proximate enlarged head 14, an intermediate portion 20, a distal portion 22, and a drilling tip 16 generally opposite enlarged head 14. The proximal portion 18 has a threaded exterior, such as drywall gripping threading 19, having a root 26, a crest 27 with a crest diameter DC, and a thread height DH. The intermediate portion 20 has a threaded exterior, such as member gripping threading 21, having a root 28, a crest 29 with a crest diameter MC substantially smaller than drywall gripping threading crest diameter DC, and a thread height MH substantially smaller than drywall gripping thread height DH. The distal portion 22 has a threaded exterior, such as drilling threading 23, having a root 30 that tapers toward drilling tip 16, a crest 31 with a crest diameter TC substantially smaller than drywall gripping threading crest diameter DC, and a thread height TH substantially smaller than drywall gripping thread height DH.

The friable material 1 can be one of several friable materials used in construction wherein it is desired to mount an article to the friable material 1 in order to increase the amount of load that the friable material 1 can withstand. An example of the friable material 1 is gypsum based drywall, such as the gypsum drywall sold under the trademark SHEETROCK by United States Gypsum. Drywall typically has a thickness T of ½ inch or ⅝ inch, but it can be obtained in other thicknesses, such as ⅜ inch.

Typically, friable materials such as drywall 1 are mounted to a member 2, such as a wood structural support member, plywood, or another friable material, such as another layer of drywall. The member can be a support member 2, such as a wood support member, for example a 2×4 stud or the like, evenly spaced from other wood studs, e.g. every 16 inches, or a metal support member, such as a steel support stud. Support members 2 are substantially more resistant to pullout than drywall 1 because they are much less likely to break apart. Although fastener 10 can be used on drywall 1 mounted to another sheet of drywall, or other friable materials, the present invention will be described for use with support members 2 such as a wood support stud.

The semi-rigid material 7 can also be one of several often-used materials. For example, it may be a thin piece of solid wood, fiberboard, plywood, or multiple materials having a veneer coating. The semi-rigid material may come in a variety of thicknesses, but may generally be between about 1/16 inch and about ⅛ inch.

Fastener 10 can have different lengths to accommodate different thicknesses of article to be hung from fastener 10. Fastener 10 is designed so that it can be used if the article is relatively thin or relatively thick, in which case fastener 10 may have a greater length to achieve full engagement with the drywall 1. Ideally, the length of fastener 10 is selected to limit the depth of embedment in the stud 2 or other support member, thereby reducing the associated installation torque, and drive time, so that a user can install a plurality of fasteners 10 in a relatively short period of time with a minimum of effort. Fastener 10 may be between about 1 inch and about ½ inches long, preferably between about 1⅛ inch and about 1⅜ inches long, still more preferably about ¼ inches long, and in one embodiment about 1.2 inches.

Fastener 10 is made from a material that is strong enough to withstand the torsional forces of driving fastener 10 into drywall 1 and support member 2 under normal conditions. Also, fastener 10 should be made from a material that can easily and inexpensively be formed into the specific geometry of fastener 10. Fastener 10 can be made from a metal or metal alloy that can be die cast into the shape of fastener 10, such as tin based alloys, aluminum based alloys, magnesium based alloys, copper, bronze or brass alloys, and zinc based alloys. In one embodiment, fastener 10 is made from a zinc alloy, such as Zamac 1 or Zamac 3.

Fastener 10 can also be made from plastic or other polymeric materials, e.g. an engineered plastic such as Delron, nylon, and nylon with fillers, such as glass filled nylon. However, fastener 10 should be made to be strong enough to withstand the torsional forces of driving fastener 10 into drywall 1 and support member 2 and should be strong enough to support fairly large loads. For example, testing on fastener 10 has indicated a load in excess of about 40 lbs. in drywall-only applications and in excess of about 50 lbs. when installed in drywall and an underlying support, and similar or better results are expected for installation in hollow-core door applications.

Distal Portion

Turning back to FIGS. 1-2, distal portion 22 allows fastener 10 to drill through drywall 1 and support member 2 as it may be driven manually by a user so that a separate pre-drilling step is not needed. Distal portion 22 includes a drilling tip 16, and in one embodiment, shown in FIG. 1, drilling tip 16 is generally conical in shape and is coaxial with body 12 so that drilling tip 16 comes to point 46 at body axis 6. The drilling tip 16 includes a sharp point 46 to quickly engage and penetrate the surface of the drywall 1 and the front surface of the stud 2 or support member.

Distal portion 22 includes a threaded exterior having drilling threading 23 disposed on distal portion 22 for engaging drywall 1 and support member 2. Drilling threading 23 includes a root 30 and a crest 31 having a crest diameter TC substantially smaller than drywall gripping threading crest diameter DC, and a thread height TH substantially smaller than drywall gripping thread height DH. Drilling thread height TH is also small enough so that the installation torque into the support member 2 may be achieved manually by the typical user so that drywall fastener 10 can be driven into the support member 2. Threading 23 can also include a radius of curvature, for example, of about 0.01 inches, between the base of the thread 23 and root 30, to prevent the formation of stress concentrations at base of thread 23.

Continuing with FIGS. 1-2, drilling threading root 30 tapers from intermediate portion 20 toward drilling tip 16 so that the cross sectional area of drilling threading root 30 proximate drilling tip 16 is reduced with respect to the cross sectional area at intermediate portion 20. Thread height TH of drilling threading 23 remains substantially constant along the length of distal portion 22. However, because root 30 is relatively small, particularly at drilling tip 16, thread height TH can be larger, for example larger than thread height MH of member gripping threading 21, because the small root 30 allows a larger thread height without an overly large crest diameter TC.

Distal portion threading 23 and intermediate portion threading 21 engage drywall 1 and drive drywall fastener 10 through drywall 1. If fastener 10 is driven into a location wherein a support member 2 is located behind drywall 1, drilling tip 16 hits support member 2, and if support member 2 is relatively hard with respect to drywall 1, e.g., a wood support stud, then fastener 10 typically spins within drywall 1 without axially advancing into support member 2, referred to herein as stalling. As fastener 10 stalls, distal portion threading 23 and intermediate portion threading 21 drill a hole of a predetermined size in drywall 1 while drilling tip 16 drills into support member 2. Eventually drilling tip 16 drills to a depth into support member 2, usually between about ⅛ inch and about ¼ inch, that allows distal portion threading 23 to engage support member 2 and begin pulling fastener 10 through support member 2 and drywall 1 so that drywall gripping threading 19 can engage drywall 1.

It has been found that the size of the hole drilled into drywall 1 by intermediate portion threading 21 is important in the grip created between drywall 1 and drywall gripping threading 19, particularly if drywall fastener 10 is driven into drywall 1 only. It has been found that for drywall threading 19 having a crest diameter of about ½ inch, it is ideal for the hole drilled in the drywall 1 to have a diameter of about ¼ inch. Therefore, distal portion 22 is designed to drill out a hole in drywall 1 that generally maximizes to the extent practically attainable the pullout strength of fastener 10 in drywall 1.

Continuing with FIG. 1-2, distal portion 22 can include at least one wing 54 that protrudes radially outwardly from distal portion 22 to ream out drywall 1 to form a hole having a predetermined diameter selected to maximize pullout strength in drywall 1, particularly when fastener 10 is driven into drywall 1 only, with no member 2 behind the installation location. The wing 54 may extend to a distance from axis 6 that is approximately equal to the root radius of proximal portion 18 near head 14, wherein the root radius is half of the root diameter. Wings 54 are designed to break away when they hit support member 2 so that wings 54 do not ream out support member 2, but only ream out drywall 1.

In the embodiment shown in FIG. 1, distal portion 22 includes a pair of wings 54 that protrude radially outwardly from distal portion 22. Wings 54 are evenly spaced around the perimeter of distal portion 22 so each of a pair of wings 54 are about 180° apart. Wings 54 protrude radially outwardly so that a width across wings 54 is approximately equal to root diameter of proximal portion 18 near head 14. If the hole reamed out by wings 54 is approximately equal to root diameter, the wings 54 ream out only as much drywall as is necessary, leaving behind a maximum amount of drywall 1 for engagement with drywall gripping threading 19. Wings 54 may be integral with body 12, drilling threading 23 or 23' or both. Wings 54 may be similarly shaped. However, the intersection of a wing 54 with drilling threading 23 or 23' may alter the shape of one wing 54 in comparison to another. In one embodiment, one wing 54 may be generally co-terminus with a trailing end of second drilling threading 23' which may serve to effectively increase the axial extent of wing 54.

If, when drilling tip 16 hits support member 2, there is a momentary stall as drilling tip 16 drills into support member 2, as described above, the threading on drywall fastener 10 may begin to strip away a portion of the drywall 1. For this reason, it is important that drilling threading 23 engage support member 2 and that distal portion 22 drill into support member 2 quickly so that drywall fastener 10 does not excessively strip out drywall 1 before being driven forward. Drilling threading 23 extends to an axial position that is as close to drilling tip 16 as possible so that drilling threading 23 can more quickly engage with support member 2. In one embodiment, drilling threading 23 extends substantially to said drilling tip 16 so that a lead of drilling threading 23 is axially spaced from drill tip point 46 by between about 0 inches, wherein drilling threading 23 extends substantially all the way to drilling tip 16, and about 0.06 inch. Ideally, the drilling threading 23 extends all the way to drilling tip 16, i.e., no space between tip point 46 and lead, however, it has been found that for a drilling tip that comes to a point, wherein the root essentially has a diameter of 0 inches, the drilling threading 23 actually becomes axial, which can make it difficult for the drilling threading 23 to engage support member 2. For this reason, the lead of drilling threading 23 can be spaced slightly from drilling tip 16, e.g. at about 0.02 inch.

Turning to FIG. 2, external threading 23 of distal portion 22 can include two generally helical threads 23, 23' arranged in a double helix. The double helix configuration of threads provides added support around distal portion 22 to help prevent distal portion 22 from collapsing due to the torsional forces of driving fastener 10 into support member 2. Double helix threads also provide balanced driving into support member 2 and faster engagement of drilling tip 16 with support member 2. In addition, the double lead threads 23, 23' extend to an axial position proximate to drilling tip 16 so that drywall fastener 10 can quickly engage and drill into support member 2.

Distal portion 22 may contain between about 1 and about 2 revolutions, preferably about 1.25 revolutions of double threading, as well as two drilling wings 54 that bore a hole in the drywall with a diameter approximately equal to the diameter of root 26 of the proximal portion 18. Overall, distal portion 22 and intermediate portion 20 combined may have between about 1 and about 3 revolutions of double threading. Each wing 54 comprises a generally triangular portion with one leg of the triangle approximately parallel to the outer bore of the hole to be drilled and a vertex of the triangle disposed generally towards the drilling tip 16. Preferably, wing 54 is directed in an axial direction toward drilling tip to allow wing 54 to enter drywall 1 cleanly and not ream out more drywall than necessary, which may result in reduced pullout strength. Wing 54 is attached to distal portion 22 at both root 30 and drilling thread 23. Wing 54 may have a thickness between about $20/1000$ inch and about $40/1000$ inch, preferably about 1/32 inch and is designed to break off of distal portion 22 if the wing 54 encounters a hard underlying support material.

Each thread 23, 23' of the double helix may have substantially the same pitch so that one of the threads does not overtake the other. The second thread 23' may be spaced axially from first thread 23 by approximately half the pitch of threads, i.e., about 0.1 inch for a pitch of about 0.2 inch, so that at every axial position along distal portion 22, there is a thread on either side providing structural support. The threads of a double helix may have substantially the same thread height.

A first thread 23 of the double helix may continue as a thread 21 on intermediate portion 20 while a second thread 23' is only present on distal portion 22. Both threads 23, 23' can also continue in a double helix on intermediate portion 20 to provide structural support for intermediate portion 20 as well as distal portion 22. If second thread 23' is extended onto intermediate portion 20, it provides improved grip with the support member 2.

Intermediate Portion

Returning to FIGS. 1-2, member gripping threading 21 is disposed on intermediate portion 20 and includes a root 28 and a crest 29 having a crest diameter MC substantially smaller than drywall gripping threading crest diameter DC. In the embodiment shown, root 28 of intermediate portion 20 may be frustoconical and taper slightly toward distal portion 22 so that the torque required to install fastener 10 will be minimized, particularly in wood support members 2, because it allows the root diameter MR and crest diameter MC of intermediate portion 20 to be smaller. In one embodiment, member gripping threading root 28 tapers at an angle of between about ½ degree and about 4 degrees, and in one embodiment, about 2¼ degrees.

The largest crest diameter MC of intermediate portion 20 may be selected to maximize the gripping between drywall gripping threading 19 and drywall 1, particularly when fastener 10 is to be installed in drywall only. For example, for a fastener 10 to have a drywall gripping threading crest diameter DC of about ½ inch, it is desired that the largest member gripping crest diameter MC be about ¼ inch or smaller.

In contrast to drywall gripping threading 19, described below, member gripping threading 21 has a thread height MH that is substantially smaller than the thread height DH of drywall gripping threading 19. The crest diameter MC of intermediate portion 20 is also substantially smaller than the crest diameter DC of proximal portion 18 so that the required installation torque in a support member 2, such as a wood stud, is not excessive. The crest diameter MC and thread height MH of member gripping threading 21 may be selected so that it is small enough that it does not scar or tear drywall when fastener 10 stalls when drilling into support member 2, described above, and so that member gripping threading 21 does not engage drywall 1 during stalling, which could jack drywall away from support member 2. Moreover, a smaller member gripping threading 21 crest diameter MC and thread height MH allow fastener 10 to penetrate and be driven initially into semi-rigid material 7 more quickly and with a smaller installation torque. While fastener 10 is configured to firmly engage a variety of different mounting surfaces, the configuration of intermediate portion 20 is more affected by mounting to support member 2 behind drywall 1 since intermediate portion 20 may be less likely to ultimately engage semi-rigid materials 7 in applications such as mounting to hollow core doors.

Although larger thread heights MH, TH of intermediate portion 20 and distal portion 22 would result in higher pullout strength within support member 2, it would also greatly increase the torque required to drive fastener 10 into wood or other support member materials, making it difficult for a user to install fastener 10, particularly with a hand-driven screwdriver. Therefore, thread height MH, TH should be chosen to allow for an acceptable torque in the event that some part of the intermediate portion 20 is driven into support member 2.

In the embodiment shown in FIG. 2, threading 21 of intermediate portion 20 is one generally helical thread 21 and is a continuation of drilling thread and extends on to drywall engaging thread 19 (described below). External threading 21 of intermediate portion 20 can also be a double helix similar to the double helix shown in distal portion 22 to provide added structural support on intermediate portion 20. Intermediate threading 21 can also have a radius of curvature between the base of thread 21 and root 28 to prevent the formation of stress concentration along the base of thread 21.

The combined length of intermediate portion 20 and distal portion 22 may be larger than the thickness of the drywall 1 so that when fastener 10 stalls before beginning to drill into support member 2, the larger crested threading 19 of proximal portion 18 (described below) is not engaged with drywall 1, which would tend to strip out the drywall 1. This length should also be long enough so that distal portion 22 completes its drilling of drywall 1 before drywall gripping threading 19 begins to engage drywall 1, particularly when fastener 10 is driven into drywall 1 only. This is desirable because drilling into a material tends to axially advance through the material substantially slower than driving through the material with threading. For example, fastener 10 is driven axially through drywall 1 by drywall gripping threading 19 much faster than fastener 10 can drill into drywall 1. If the drilling step is not completed before drywall gripping threading 19 begins to engage drywall 1, it is likely that drywall gripping threading 19 will strip out drywall 1 rather than drive fastener 10 through it. Additionally, it is important to properly proportion the lengths of intermediate portion 20 and distal portion 22 to the installation torques required to drive fastener 10, particularly into support member 2.

Proximal Portion

Returning to FIGS. 1-2, proximal portion 18 includes an exterior thread for engagement with drywall 1 when fastener 10 is installed so that the load of an article to be held by the fastener 10 will be supported by drywall 1, particularly if fastener 10 is driven into drywall 1 only. Drywall gripping threading 19 taps a mating thread in drywall 1 so that an engagement between drywall gripping threading 19 and drywall 1 is accomplished. Drywall gripping threading 19 may also be considered panel gripping threading 19 when fastener 10 is installed in a semi-rigid material 7 such as the panel of a hollow core door or proximal portion threading 19 generally.

The threaded exterior includes threading 19 disposed on proximal portion 18 having a crest 27 with a crest diameter DC and a root 26 having a root diameter DR. Proximal portion threading 19 is high threading wherein the distance between crest 27 and root 26, or the thread height DH, is large relative to member gripping threading 21 and drilling threading 23. High proximal portion threading 19 helps to maximize the surface area of proximal portion threading 19 encountered by drywall 1, increasing the pullout strength. The thread height DH of proximal portion threading 19 is substantially larger than the thread heights MH, TH of member gripping threading 21 and drilling threading 23, which provides for higher pullout strength in drywall 1 or semi-rigid materials 7. The diameter DC of proximal portion threading crest 27 can remain essentially the same along the entire length of proximal portion 18. In one embodiment, the diameter DC of crest 27 is at least twice the diameter DR of root 26.

Figure 6:
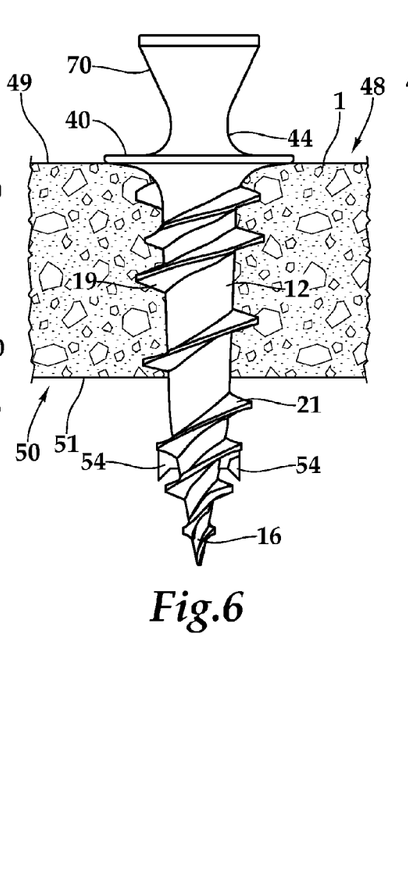
FIG. 6 is a side view of the fastener of FIGS. 1-2 illustrating the fastener engaging a friable substrate.
Figure 7:
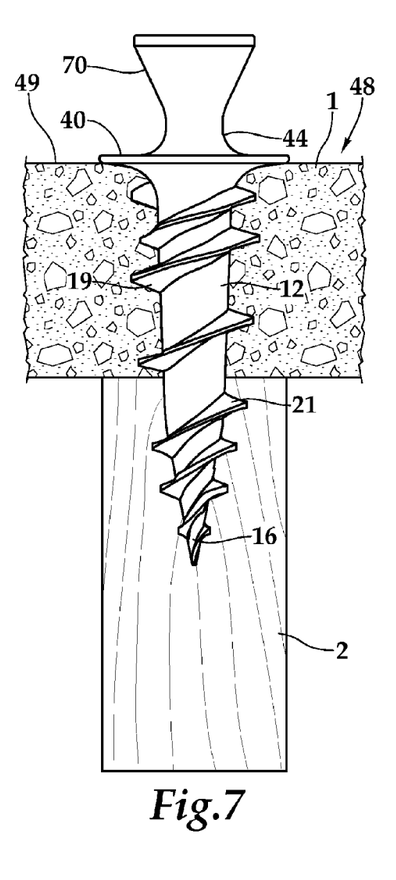
FIG. 7 is a side view of the fastener of FIGS. 1-2 illustrating the fastener engaging a friable substrate and a support underlying the substrate.

Turning to FIG. 6, drywall gripping threading 19 may be designed to prevent an unsightly appearance of front surface 48 of drywall 1. Drywall gripping threading 19 may be truncated at a proximal end proximate the underside 41 of collar 40 to form a generally flat rearward-facing land or flat 25 that may be generally perpendicular to axis 6. Instead of continuing to push loosened drywall 1 toward underside 41 of collar 40, this may create an unthreaded neck portion 64 of fastener 10 in which the drywall 1 is compressed between the outer drywall surface 48 and the high drywall gripping threading 19. In addition, the generally flat rearward-facing land 25 may prevent drywall gripping threading 219 from snagging a front surface of drywall 1 since snagging paper on the front surface of drywall 1 may result in a cosmetically unsightly final appearance or may inhibit collar 40 from sitting flush against front surface 48 of drywall 1. Unthreaded neck 64, i.e. the distance between the generally flat rearward facing land 25 and collar 40 may be between about 1/32 inch and about 1/10 inch, preferably between about 4/100 inch and about 3/32 inch, still more preferably about 6/100 inch.

Approximately 3/4 of a turn of drywall gripping threading 19 may be engaged behind drywall 1 so that drywall engaging threading engages the paper 51 on the rear surface 50 of drywall 1. Engaging paper 51 on drywall rear surface 50 is particularly desirable when driving fastener 10 into drywall only, because it has been found that engagement with the paper 51 provides a substantial portion of the grip between fastener 10 and drywall 1. Drywall gripping threading 19 is not intended to be driven into support member 2 because the high drywall gripping threading 19 would require a very high torque to drive drywall fastener 10 into support member 2.

Figure 8:
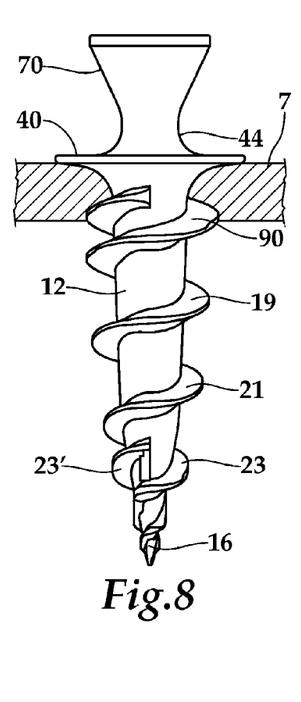
FIG. 8 is a side view of the fastener of FIGS. 1-2 illustrating the fastener engaging a thin rigid or semi-rigid material.

Turning to FIG. 8, preferably between at least approximately 1/4 and 1/2 of a turn of proximal portion threading 19 engages semi-rigid material 7. Proximal portion threading 19 may be spaced from collar 40 so as to allow for both engagement of proximal portion threading 19 with semi-rigid material 7 as well as compression of semi-rigid material 7 between collar 40 and proximal portion threading 19.

Returning to FIG. 1, root 26 of proximal portion 18 can be tapered toward intermediate portion 20 so that root 26 may be generally frustoconical, and so that the diameter of root 26 at the top of proximal portion 18 is larger than the diameter of root 26 at the bottom of proximal portion 18. Tapered root 26 of proximal portion 18 and tapered root 28 of intermediate portion 20 may be generally continuous and taper at approximately the same angle.

In the embodiment shown in FIGS. 1-2, exterior threading 19 of proximal portion 18 is one thread 19 that is a continuation of member gripping thread 21, except that drywall gripping threading 19 has a substantially larger crest diameter DC and a substantially larger thread height DH than the crest diameter MC and thread height MH of intermediate portion 20. In one embodiment, crest diameter DC of proximal portion 18 is about twice the crest diameter MC of intermediate portion 20. Crest diameter DC may be between about 1/4 inch and about 1/2 inch, preferably between about 1/4 inch and about 3/8 inch, still more preferably about 3/16 inch. Thread height MH may be between about 1/16 inch and about 3/16 inch, preferably between about 1/16 inch and about 3/32, and in one embodiment about 0.075 inch. Proximal portion root 26 may be between about 1/8 inch and about 3/8 inch, preferably between about 1/8 inch and about 1/4 inch, and in one embodiment about 0.175 inch.

There may be a transition zone between intermediate portion 20 and proximal portion 18 wherein the crest diameter and thread height enlarge from member gripping thread 21 to drywall gripping thread 19. In one embodiment, the transition zone 62 extends for about 3/4 of a thread turn. Drywall gripping threading 19 is generally helical, as best shown in FIG. 2. Drywall gripping thread 19 can also include a radius of curvature between the base of the thread 19 and root 26 to minimize stress concentration at the base of drywall thread 19.

The length of proximal portion 18, including head 14, may be about equal to, or may be slightly larger than, the thickness of the drywall 1, so that there is a portion of drywall gripping threading 19 behind drywall rear surface 50 to engage rear surface paper 51. The length DL of proximal portion 18 may be selected to balance the length of drywall gripping threading 19 engaging the paper 51 on the rear surface 50 of drywall 1 with the torque required to drive that length of drywall gripping threading 19 into a support member 2, if fastener 10 is driven into a location where a support member 2 is located. In addition, it is desirable that fastener 10 be usable with different thicknesses of drywall 1, so that a certain length of proximal portion 18 may allow threading 19 to engage rear surface paper 51 in one thickness of drywall 1, but may be too short to engage rear surface paper 51 in a thicker drywall, or conversely, proximal portion 18 may be too long so that too much of drywall gripping threading 19 must be driven into a support member 2 for a thinner drywall 1, resulting in a higher required installation torque.

The pitch of drywall gripping threading 19 is chosen so that there preferably is at least one full turn of drywall gripping threading 19 in drywall 1, and preferably between about 1¾ turns and about 2¼ turns, still more preferably about 2 full turns of drywall gripping threading 19 embedded in drywall 1. In one embodiment, for drywall 1 having a thickness of ½ inch or ⅝ inch, the pitch P of drywall gripping threading 19 is between about ⅛ inch and about 0.3 inch, and in one embodiment, about 0.2 inch. Preferably, the pitch of drywall gripping thread 19 is generally equal to the pitches of member gripping threading 21 and drilling thread 23. In one embodiment (not shown) the pitch of drywall gripping threading 19 proximate transition zone 62 has a larger pitch than the remaining thread 19 proximate collar 40. When this larger pitched threading engages drywall 1, it pulls fastener 10 into drywall 1 relatively fast, helping to counteract any jacking, or lifting of the drywall away from the support member, that may tend to occur.

With respect to threading in each section, threading 19, 21, 23 of fastener 10 may be generally narrow such that there are sections of unthreaded root on body 12 between successive turns of threading 19, 21, 23. In addition, threading may have a small land or radius of curvature 96 between forward facing and rearward facing sides of threading at a radially outermost portion of threading 19, 21, 23. Land or radius of curvature 96 may be between about 0 inch and about ​1/16​ inch thick. Preferably land or radius of curvature 96 may be about 0 inch thick to facilitate threading 19, 21, 23 moving through drywall 1 with diminished resistance and minimal drywall disturbed. However, manufacturing tolerances or molding requirements may compel land or radius of curvature be larger than about 0 inch thick. In one embodiment, land is about 0.015 inches thick.

Tertiary Thread

Figure 5:
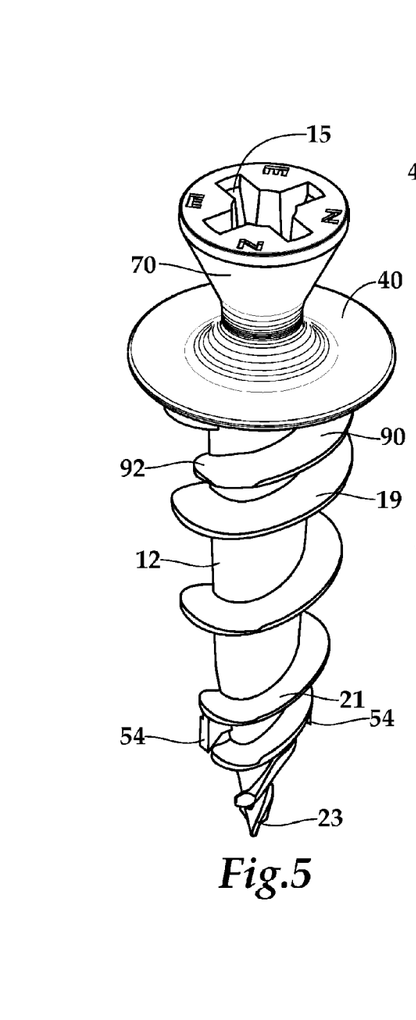
FIG. 5 is a perspective view of the fastener of FIGS. 1-2.

As shown in FIGS. 1-2 and 5, fastener 10 may have an additional, tertiary thread 90 proximate flange or collar 40. Additional thread 90 may have a terminal end 91 circumferentially spaced from a terminal end 17 of proximal portion threading 19. Additional thread 90 may further have a leading end 92 generally circumferentially aligned with a terminal end 17 of proximal portion. Preferably, terminal end 91 of additional thread 90 may each be offset from terminal end 17 of proximal portion threading 19 by between about 120 and about 240 degrees, preferably between about 150 and about 210 degrees, still more preferably about 180 degrees.

Offsetting additional thread 90 from proximal portion threading 19 means that a plurality of threads may be engaged in the substrate 1 or 7 when fastener 10 is fully installed. Moreover, offsetting of threads may cause proximal portion threading 19 and additional thread 90 to be generally diametrically opposed such that, when installed, there is at least one diameter at which fastener 10 engages substrate 1 or 7 on both sides, resulting in a more even distribution of force during loading and a stronger, more stable engagement of fastener 10. Without additional thread 90, when fastener 10 is installed in a thin substrate such as the face 7 of a hollow core door, proximal portion threading 19 may either not engage face 7 or may only engage face 7 on one side of fastener 10, resulting in a weaker, less stable engagement and, subsequently, a lower holding strength.

Additional thread 90 may have a circumferential extent of between about ¼ turn and about 1½ turns, preferably between about ¼ and about 1 turn, still more preferably between about ¼ and about ¾ turns. In one about embodiment, additional thread 90 may have a circumferential extent of about ½ turn such that terminal end 91 and leading end 92 may be generally diametrically opposed.

Terminal end 91 may be tapered, for example by rounding off terminal end 91 to have a generally semicircular shape or by other forms of tapering. Tapered terminal end 91 may allow root 93 of additional thread 90 to continue closer to collar 40, allowing for engagement with a greater amount of material, be it a friable material such as drywall 1 or a semi-rigid material such as a wood panel 7 in a hollow core door, increasing holding strength. At the same time, tapering limits the axial extent of a crest 94 of additional thread 90, such that crest 94 at terminal end 91 is further from collar 40 than it would otherwise be if terminal end 91 were not tapered. As a result, additional thread 90 is less likely to tear paper 49 on front surface 48 of drywall 1, which would both create an unsightly appearance on the surface 48 and reduce the holding strength of the fastener 10.

Leading end 92 of additional thread 90 may also be tapered from root 93 to crest 94. In contrast to semi-circular tapering of terminal end 91, additional thread 90 may begin at a point at leading end 92 and may gradually increase in thickness as it travels around body 12. Tapering of leading end 92 may allow additional thread to slice into semi-rigid material 7 or drywall 1 more quickly and easily with less resistance, thereby resulting in less disruption to the face of semi-rigid material 7 or paper 49 on surface 48 of drywall 1.

Leading end 92 may begin about halfway between turns of proximal portion thread 19 and may have generally the same pitch as proximal portion thread 19. In the embodiment in which additional thread 90 has a circumferential extent of about ½ turn, terminal ends 17 and 91 may be generally diametrically opposed and may be generally evenly axially spaced from collar 40. Terminal ends 17 and 91 may approximately axially overlie start of radius or neck 64 proximate underside of collar 40. However, terminal ends 17 and 91 may continue onto neck 64. Terminal ends 17 and 91 may be spaced from collar 64 by between about ​1/32​ inch and about ⅛ inch, preferably about ​1/16​ inch. Terminal ends 17 and 91 may be spaced from collar 40 to minimize tearing or deformity of paper 49 of drywall surface 48 when used in drywall applications. Notably, however, terminal ends 17 and 91 should be spaced close enough to collar 40 to ensure that at least a portion of proximal portion thread 19 and additional thread 90 engage semi-rigid material 7 when used in that application.

Figure 3:
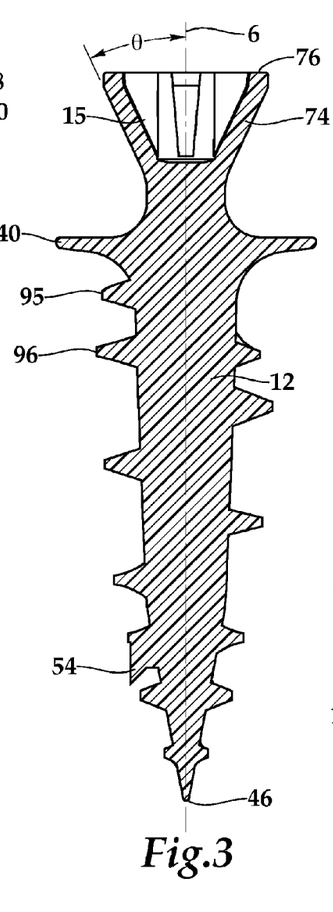
FIG. 3 is a section view of the fastener of FIG. 2 taken through line 3-3.
Figure 4:
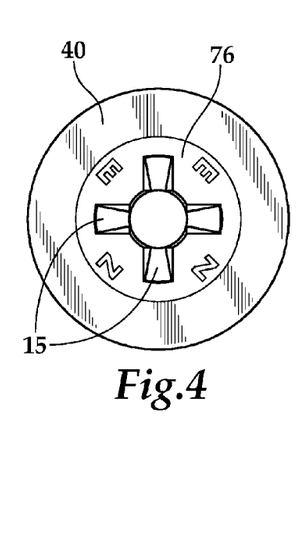
FIG. 4 is a top view of the fastener of FIGS. 1-2.

Additional thread 90 may be generally helical. However, as shown in FIGS. 2-3, additional thread 90, as well as external threading 19, 21, 23 and 23' may have one or more flats 95, 96 where thread 90 deviates from a generally helical shape to extend generally perpendicular to axis 6. Due to its comparatively limited extent, additional thread 90 may only have one flat 95. Preferably, however, threads 19, 21, 23 and 23' have a plurality of flats 96. Still more preferably, flats 96 may be generally diametrically opposed. Even more preferably, threads 19, 21, 23 and 23' may have a flat 96 about every 180 degrees of rotation. Flats 95, 96 may have a circumferential extent of between about 30 degrees and about 90 degrees, preferably between about 45 degrees and about 75 degrees. Flats 95 and 96 increase surface area of threads 19, 21, 23, 23' and 90, which increases the amount of engagement between threads 19 and 90 with drywall 1 or semi-rigid material 7 or the area of compression between paper 51 on rear surface 50, thereby additionally increasing holding strength of fastener 10.

Flange

Moving rearward from proximal portion 18, fastener 10 may have a generally cylindrical flange 40 extending radially outward. Flange 40 may be spaced from terminal end 17 of proximal portion thread 19 and terminal end 91 of tertiary thread 90 to create non-threaded neck portion 64 that allows for compression of drywall 1 or semi-rigid material 7 to maintain both the functional and cosmetic characteristics of the mounting surface. In addition, flange 40 may extend to a diameter larger than a largest crest diameter DC of proximal portion threading 19. Flange diameter may be between about ¼ inch and about ¾ inch, preferably between about ¼ inch and about ½ inch, still more preferably between about ⅜ inch and about ½ inch, and in one embodiment about 0.45 inches. Flange 40 may also have a thickness large enough to provide sufficient compression strength to flatten mounting surface. Flange 40 may be between about 1/64 inch and about 1/16 inch thick, preferably between about 1/64 inch and about 1/32 inch thick, and in one embodiment, about 0.025 inches thick.

Head

Turning to FIGS. 1-5, head 70 of fastener extends outward from flange 40 and includes features that allow a user to hang various types of objects from fastener 10. For example, head 70 may have a maximum diameter between about ⅛ inch and about ½ inch, preferably between about ¼ inch and about ⅜ inch, still more preferably between about ¼ inch and about 5/16 inch, and in one embodiment about 0.285 inches. Head 70 may also have similar dimensions from rear surface 76 to flange 40. In addition, head 70 may taper from a rear surface 76 to a generally axially extending span 44 proximate flange 40. Span 44 may have a diameter between about 1/16 inch and about 3/16 inch, preferably between about ⅛ inch and about 3/16 inch, and in one embodiment about 0.135 inches. As such, diameter of span 44 may be between about 25% and about 50% of flange 40, preferably between about 25% and about 33%, and in one embodiment, about 30%. In addition, head 70 may be sized for D-ring or keyhole-type applications that have a larger opening for rear surface 76 to pass through and a smaller opening or channel through which span 44 travels, ultimately resting in smaller opening and holding object.

In addition, taper of underside 72 of head 70 allows for hanging objects supported by wires, threads, strings or the like. Wire may pass between rear surface 76 and flange 40 and rest on span 44. Because underside 72 is angled outward away from span 44, wire will remain on span 44. As seen in FIGS. 2-3, underside 72 may be angled between about 20 degrees and about 30 degrees, preferably between about 23 degrees and about 27 degrees, still more preferably about 25 degrees. Additionally, underside 72 may have an axial length from rear surface 76 to span 44 of between about ⅛ inch and about ¼ inch, preferably between about ⅛ inch and about 3/16 inch, and in one embodiment, about 0.155 inch. Similarly, angled underside 72 may have an axial length between about 40% and about 70% of total axial length of head 70, preferably between about 45% and about 65%, more preferably about 55%. Moreover, fastener 10 may include a radius of curvature, for example, of about 1/16 inch, between flange 40 and span 44 to prevent stress concentrations created by installation or hanging forces on head 70.

Head 70 also includes a small, generally axial or generally non-radially extending portion 78 between rear surface 76 and angled underside 72 with a matching portion inside recess to larger surface area for torque transmitting surfaces 15 to more efficiently transfer installation and removal forces. In the embodiment shown in FIG. 3, generally axial portion 78 may have a thickness similar to thickness of flange 40, for example, about 0.023 inches.

Head 70 further may have torque transmitting surfaces 15 so that fastener 10 can be rotated with a driver by the user. Illustrated recess with surfaces 15 is a Phillips-type recess for receiving the tip of a Phillips-type driver; however, other torque transmitting configurations are embodied in this invention. Recess and surfaces 15 may be angled substantially similarly to angle of underside 72 of head 70, forming a wall 74 of generally uniform thickness. Wall 74 may be between about 1/64 inch and about 1/16 inch thick, preferably between about 1/32 inch and about 1/16 inch, and in one embodiment, about 0.0325 inches thick.

Torque transmitting surfaces 15 may continue along head 70 substantially the length of angled underside 72, stopping generally where span 44 begins, such that span 44 is a generally solid body. Solid span 44 may be advantageous for multiple reasons. First, a solid body may be able to support a heavier object suspended from span 44 than a hollow body would. Second, solid span 44 adds strength to head 70 to prevent breakage during installation of fastener 10. Reduced depth of surfaces 15 provides sufficient surface area for transmitting torque during installation while solid span 44 adds additional tensile strength to prevent head 70 from snapping off, particularly during installation into support member 2, for which larger installation torque may be required.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A self-drilling fastener hanging an object, comprising:
an elongated body having an axis, a threaded exterior having a root, a proximal portion, an intermediate portion, a distal portion, and a drilling tip generally opposite said enlarged head;
said proximal portion having an axial length and threads adapted for gripping a friable material, said threads having a root diameter, a crest diameter at least about twice said root diameter and a thread height;
said intermediate portion having an axial length and threads adapted for gripping a member underlying said friable material, said member having a hardness greater than a hardness of said friable material, said intermediate portion threads having a crest diameter substantially smaller than said crest diameter of said proximal portion thread and a thread height substantially smaller than said thread height of said proximal portion thread;
said distal portion having an axial length and threads for drilling into said member, a root that tapers toward said drilling tip, said distal portion threads having a crest diameter substantially smaller than said crest diameter of said proximal portion thread and a thread height substantially smaller than said thread height of said proximal portion thread;
a flange proximate a rear end of said proximal portion thread, said flange having a diameter larger than said proximal portion crest diameter; and
a head extending rearwardly from said flange, said head having an angled underside expanding outwardly from said flange toward a rear surface and a generally axially extending portion proximate said flange;
wherein said generally axially extending portion has a diameter smaller than a largest diameter of said elongated body.

2. A self-drilling fastener according to claim 1, wherein said underside of said head is angled between about 20 degrees and about 30 degrees with respect to said axis.

3. A self-drilling fastener according to claim 1, wherein said underside of said head is angled about 25 degrees with respect to said axis.

4. A self-drilling fastener according to claim 1, further comprising torque transmitting surfaces within said head, said torque transmitting surfaces angled substantially similarly with respect to said axis as said angled underside of said head.

5. A self-drilling fastener according to claim 1, said head further comprising:
   torque transmitting surfaces within said head; and
   a solid, generally axially extending portion between said torque transmitting surfaces and said flange.

6. A self-drilling fastener adapted for mounting in a plurality of substrates of different types, comprising:
   a shank having a generally conical drilling portion, an intermediate portion and a proximal portion;
   said generally conical drilling portion having a drilling tip and a thread;
   said intermediate portion having a thread larger than said drilling portion thread and a crest diameter larger than a largest crest diameter of said drilling portion;
   said proximal portion having a thread larger than said intermediate portion thread and substantially larger than said drilling portion thread and a crest diameter larger than said intermediate portion crest diameter and substantially larger than said drilling portion largest crest diameter;
   a second thread disposed around a portion of said proximal portion, wherein said second thread extends for about one-half of a revolution around said proximal portion;
   a substantially unthreaded portion proximate said proximal portion and leading to a generally cylindrical flange; and
   an elongated head extending from said flange, said elongated head comprising a solid-bodied generally axially extending portion proximate said flange and a generally frustoconical portion extending to a rearward end of said fastener.

7. A self-drilling fastener according to claim 6, further comprising:
   a second drilling thread around said drilling portion.

8. A self-drilling fastener according to claim 6, further comprising:
   a plurality of wings disposed on said drilling portion, said wings having a radial extent substantially equal to a largest root diameter of said shank.

9. A self-drilling fastener according to claim 6, wherein said generally cylindrical flange has a diameter larger than a largest crest diameter of said proximal portion thread.

10. A self-drilling fastener according to claim 6, further comprising a first radius of curvature between said shank and said generally cylindrical flange and a second radius of curvature between said generally cylindrical flange and said solid-bodied generally cylindrical portion.

11. A self-drilling fastener adapted for hanging an object, comprising:
    a shank having a first threading adapted for gripping a friable material, a second threading adapted for gripping a member underlying said friable material, said member having a hardness greater than a hardness of said friable material, a third threading adapted for drilling into said member and a fourth threading adapted for gripping a semi-rigid material;
    a generally cylindrical flange proximate said shank; and
    an elongated head having a generally axially extending portion proximate said generally cylindrical flange and a generally frustoconical portion proximate said generally cylindrical portion;
    wherein said generally axially extending portion has a diameter smaller than a largest diameter of said shank.

12. A self-drilling fastener according to claim 11, wherein said first threading and said fourth threading cooperate to maintain a thickness of said semi-rigid material between turns of said first and fourth threading.

13. A self-drilling fastener according to claim 11, wherein said generally frustoconical portion angles approximately 25 degrees with respect to an axis of said fastener.

14. A self-drilling fastener according to claim 11, wherein said elongated head further comprises torque transmitting surface inclined with respect to an axis of said fastener at substantially a same angle as an underside of said generally frustoconical section.

15. A self-drilling fastener according to claim 14, wherein said torque transmitting surfaces have an axial extent from a rear surface of said fastener less than an axial extent of said generally frustoconical section.

16. A self-drilling fastener according to claim 11, wherein said elongated head has a length between about ¼ inch and about 5/16 inch.

* * * * *